United States Patent
Lee

(10) Patent No.: US 7,482,856 B2
(45) Date of Patent: Jan. 27, 2009

(54) VPP VOLTAGE GENERATOR FOR GENERATING STABLE VPP VOLTAGE

(75) Inventor: Jeong Woo Lee, Seoul (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 5 days.

(21) Appl. No.: 11/319,565

(22) Filed: Dec. 29, 2005

(65) Prior Publication Data

US 2006/0273844 A1 Dec. 7, 2006

(30) Foreign Application Priority Data

Jun. 7, 2005 (KR) .................. 10-2005-0048301

(51) Int. Cl.
*G05F 1/10* (2006.01)
(52) U.S. Cl. .................. 327/536; 363/60
(58) Field of Classification Search .......... 327/530, 327/534, 535, 536, 537; 363/59, 60; 365/189.09
See application file for complete search history.

(56) References Cited

U.S. PATENT DOCUMENTS

| | | | | |
|---|---|---|---|---|
| 5,276,646 | A * | 1/1994 | Kim et al. | 365/189.09 |
| 5,553,030 | A * | 9/1996 | Tedrow et al. | 365/226 |
| 5,592,063 | A * | 1/1997 | Savignac et al. | 320/166 |
| 5,812,017 | A * | 9/1998 | Golla et al. | 327/536 |
| 5,883,501 | A * | 3/1999 | Arakawa | 323/222 |
| 5,920,226 | A * | 7/1999 | Mimura | 327/537 |
| 5,946,258 | A * | 8/1999 | Evertt et al. | 365/226 |
| 6,016,072 | A * | 1/2000 | Ternullo et al. | 327/535 |
| 6,018,264 | A * | 1/2000 | Jin | 327/536 |
| 6,091,282 | A * | 7/2000 | Kim | 327/536 |
| 6,100,748 | A * | 8/2000 | Oh | 327/526 |
| 6,130,829 | A * | 10/2000 | Shin | 363/60 |
| 6,137,732 | A * | 10/2000 | Inaba | 365/189.09 |
| 6,154,411 | A * | 11/2000 | Morishita | 365/226 |
| 6,400,216 | B1 * | 6/2002 | Kim et al. | 327/548 |
| 6,414,881 | B1 * | 7/2002 | Fujii et al. | 365/189.09 |
| 6,456,153 | B2 * | 9/2002 | Buck et al. | 327/536 |
| 6,876,247 | B2 * | 4/2005 | Jang et al. | 327/536 |
| 7,042,774 | B2 * | 5/2006 | Kim | 365/189.11 |
| 7,129,772 | B2 * | 10/2006 | Kim et al. | 327/536 |
| 7,279,959 | B1 * | 10/2007 | Choy | 327/536 |
| 2001/0045841 | A1 * | 11/2001 | Kondo et al. | 324/765 |
| 2003/0112056 | A1 * | 6/2003 | Tanzawa et al. | 327/536 |
| 2004/0066225 | A1 * | 4/2004 | Seo | 327/536 |
| 2004/0130300 | A1 * | 7/2004 | Kwon et al. | 322/28 |
| 2004/0207458 | A1 * | 10/2004 | Origasa et al. | 327/535 |

(Continued)

FOREIGN PATENT DOCUMENTS

KR 100279077 10/2000

(Continued)

*Primary Examiner*—Kenneth B Wells
*Assistant Examiner*—Thomas J Hiltunen
(74) *Attorney, Agent, or Firm*—Lowe Hauptman Ham & Berner, LLP

(57) ABSTRACT

The present invention relates to a VPP voltage generator that generates a stable VPP voltage. The VPP voltage generator of the present invention generates a stable VPP voltage. Therefore, power consumption can be saved, a precharge time of word line can be prevented from increasing and a tRCD characteristic can be improved. It is thus possible to improve the operational performance of semiconductor memory devices.

20 Claims, 6 Drawing Sheets

U.S. PATENT DOCUMENTS

| | | | |
|---|---|---|---|
| 2005/0168263 A1* | 8/2005 | Fukuda et al. | 327/535 |
| 2005/0195019 A1* | 9/2005 | Okamoto | 327/536 |
| 2007/0120591 A1* | 5/2007 | Cheung et al. | 327/536 |
| 2007/0139099 A1* | 6/2007 | Pan | 327/536 |

FOREIGN PATENT DOCUMENTS

| | | |
|---|---|---|
| KR | 1020010011502 | 2/2001 |
| KR | 1020010027124 | 4/2001 |
| KR | 1020060022161 | 3/2006 |

* cited by examiner

VPP VOLTAGE GENERATOR FOR GENERATING STABLE VPP VOLTAGE

BACKGROUND

1. Field of the Invention

The present invention relates to semiconductor memory devices and more particularly, to a VPP voltage generator of a semiconductor memory device.

2. Discussion of Related Art

In general, a semiconductor memory device generates a VPP voltage (VPP) higher than an external voltage (VDD) and applies the generated VPP voltage to several circuits of the semiconductor memory device such as a word line driver, a bit line isolation circuit and a data output buffer.

The VPP voltage can compensate for the loss of threshold voltages of transistors included in the internal circuits of the semiconductor memory device. More particularly, in a DRAM including a memory cell consisting of one cell capacitor and one cell transistor, a VPP voltage (VPP) higher than a voltage (VDD) when data are '1' must be applied to the gate of the cell transistor in order to accurately store data in the memory cell.

FIG. 1 is a schematic block diagram of a VPP voltage generator in the related art. Referring to FIG. 1, the VPP voltage generator 10 includes an oscillator 11 and a pumping circuit 12.

The oscillator 11 periodically generates a pumping control signal (CTL) of a pulse form. The pumping circuit 12 generates a VPP voltage (VPP) through a charge pumping operation in response to the pumping control signal (CTL). The VPP voltage (VPP) is supplied to word lines when the word lines to which memory cells are connected are activated in a memory cell array (not shown) of a semiconductor memory device.

In a burst write operation, a burst read operation and a refresh operation of the operations of a semiconductor memory device such as DRAM, the amount of the VPP voltage (VPP) consumed is increased. In the VPP voltage generator 10, however, a cycle (i.e., an oscillation cycle) where the oscillator 11 generates the pumping control signal (CTL) is fixed to a set value. Therefore, there is a problem in that the VPP voltage generator 10 does not generate a VPP voltage (VPP) suitable for each operating mode of the semiconductor memory device. This problem serves to degrade the operational performance of the semiconductor memory device. This will be described below in more detail.

For example, a case where the oscillation cycle of the oscillator 11 is set to be short and the amount of the VPP voltage (VPP) consumed is reduced can be considered. In this case, the pumping circuit 12 performs an excessive charge pumping operation in response to the pumping control signal (CTL) that is frequently generated by the oscillator 11. As a result, as the VPP voltage (VPP) becomes unnecessarily high, a phenomenon in which the VPP voltage exceeds a target voltage (i.e., an overshoot phenomenon) occurs.

If the VPP voltage (VPP) is overshooted as described above, the voltage of an activated word line becomes unnecessarily high. Therefore, when the word line is disabled, a problem arises because a precharge time (tRP) of the word line is increased. There is also a problem in that the amount current consumed is increased due to an excessive charge pumping operation of the pumping circuit 12.

Meanwhile, a case where the oscillation cycle of the oscillator 11 is set to be long and the amount of the VPP voltage (VPP) consumed is increased can be taken into consideration. In this case, the pumping circuit 12 performs the charge pumping operation in response to the pumping control signal (CTL) that is rarely generated by the oscillator 11. As a result, as the VPP voltage (VPP) is lowered, a target voltage is lowered.

If the VPP voltage (VPP) is lower than the target voltage as described above, a voltage level of the word line does not sufficiently rise up to the VPP voltage (VPP) when the word line is activated. Therefore, charge sharing between bit lines is not smooth and development between bit lines is not properly performed accordingly. As a result, problems arise because a RAS-To-CAS Delay (tRCD) characteristic is lowered and I/O margin of data is short.

Furthermore, if the VPP voltage (VPP) is lower than a target voltage, there are problems in that a data retention time reduces and a refresh characteristic decreases in the refresh operation of the semiconductor memory device. There is also a problem in that the operational performance of the semiconductor memory device is lowered since the refresh operation speed is reduced.

SUMMARY OF THE INVENTION

An advantage of the present invention is that it provides a VPP voltage generator, in which an oscillation cycle of an oscillator circuit is controlled depending on variation in the level of a VPP voltage, thus generating a stable VPP voltage, whereby the precharge time of word lines can be prevented from increasing, an tRCD characteristic can be improved and the operational performance of a semiconductor memory device can be enhanced.

A VPP voltage generator according to an aspect of the present invention includes an oscillator circuit, a pumping circuit, a VPP voltage detector and a cycle control circuit. The oscillator circuit periodically generates a pumping control signal of a pulse form based on an oscillation cycle set according to first and second cycle control signals. The oscillator circuit is enabled in response to an enable control signal. The pumping circuit performs a charge pumping operation in response to the pumping control signal, thus generating a VPP voltage. The VPP voltage detector detects the level of the VPP voltage and outputs first and second detection signals according to the detection result. The cycle control circuit outputs the first and second cycle control signals in response to the first and second detection signals.

A VPP voltage generator according to an aspect of the present invention includes an oscillator circuit that periodically generates a pumping control signal of a pulse form based on an oscillation cycle set according to first and second detection signals, the oscillator circuit being enabled in response to an enable control signal, a pumping circuit that performs a charge pumping operation in response to the pumping control signal, thus generating a VPP voltage, and a VPP voltage detector that detects the level of the VPP voltage and outputs the first and second detection signals according to the detection result.

DETAILED DESCRIPTION OF PREFERRED EMBODIMENTS

The present invention will now be described in connection with preferred embodiments with reference to the accompanying drawings.

Figure 1:
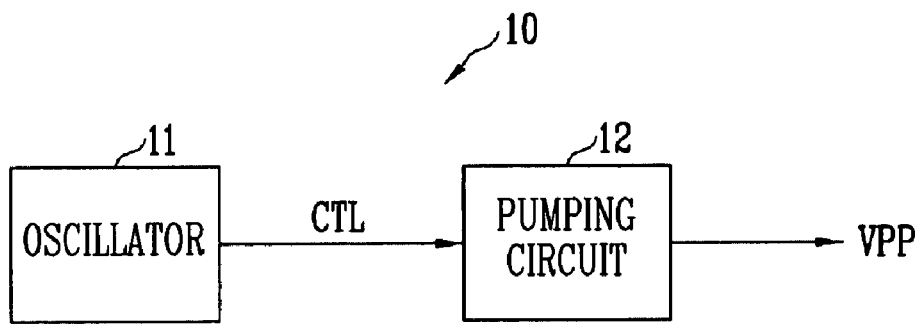
FIG. 1 is a schematic block diagram of a VPP voltage generator in the related art.
Figure 2:
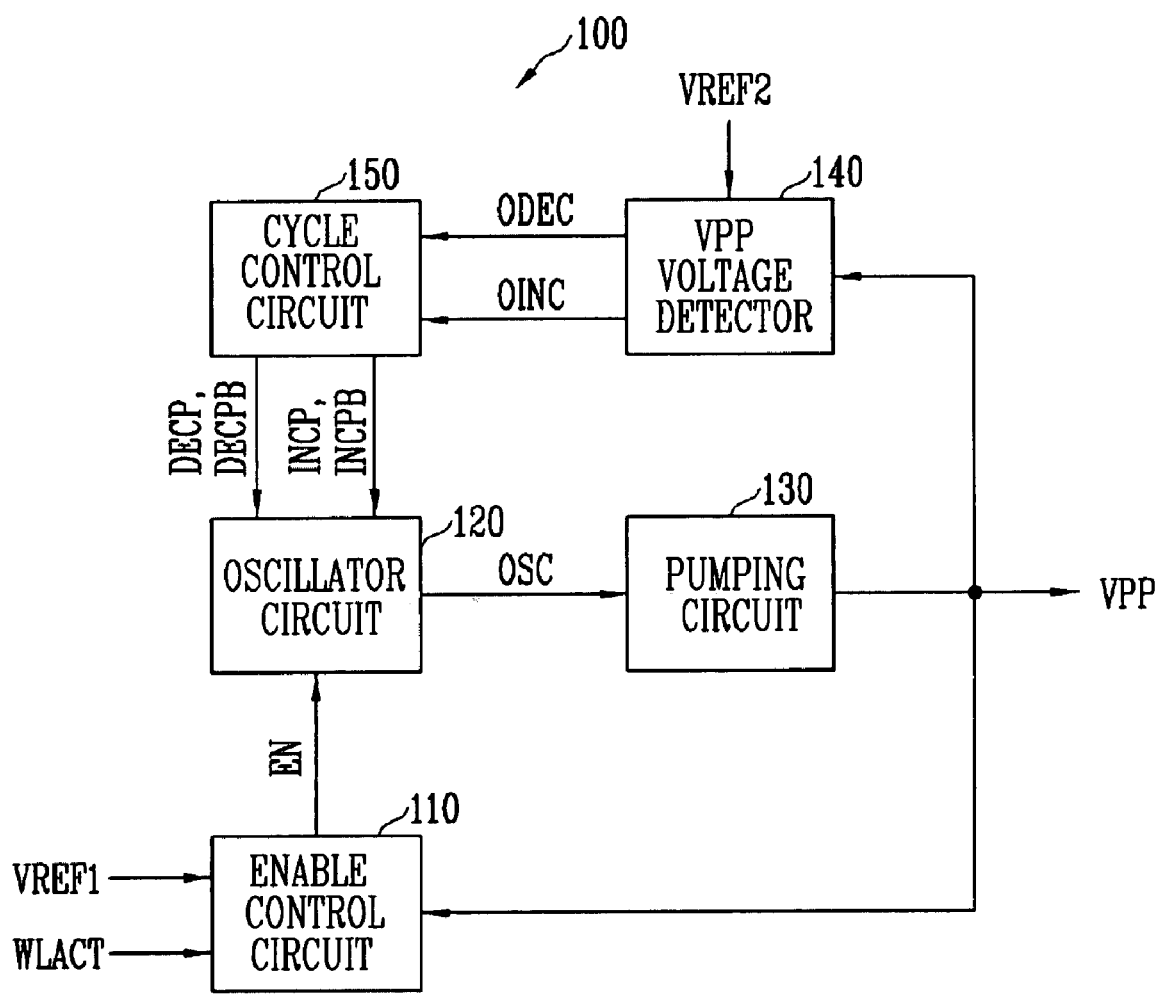
FIG. 2 is a schematic block diagram of a VPP voltage generator according to an embodiment of the present invention.

FIG. 2 is a schematic block diagram of a VPP voltage generator according to an embodiment of the present invention.

Referring to FIG. 2, a VPP voltage generator 100 includes an enable control circuit 110, an oscillator circuit 120, a pumping circuit 130, a VPP voltage detector 140 and a cycle control circuit 150.

The enable control circuit 110 compares a VPP voltage (VPP) with a reference voltage (VREF1) and generates an enable control signal (EN) depending on the comparison result, in response to a word line activation signal (WLACT). In more detail, when the word line activation signal (WLACT) is enabled, the enable control circuit 110 enables the enable control signal (EN) if the VPP voltage (VPP) is lower than the reference voltage (VREF1).

The oscillator circuit 120 is enabled when the enable control signal (EN) is enabled. The oscillator circuit 120 periodically generates a pumping control signal (OSC) of a pulse form based on an oscillation cycle that is set according to first and second cycle control signals (DECP, INCP) and inverted first and second cycle control signals (DECPB, INCPB).

The pumping circuit 130 performs a charge pumping operation in response to the pumping control signal (OSC), generating the VPP voltage (VPP).

The VPP voltage detector 140 detects the level of the VPP voltage (VPP) and outputs first and second detection signals (ODEC, OINC) depending on the detection result, based on a reference voltage (VREF2).

The cycle control circuit 150 outputs the first and second cycle control signals (DECP, INCP) and the inverted first and second cycle control signals (DECPB, INCPB) in response to the first and second detection signals (ODEC, OINC).

Figure 3:
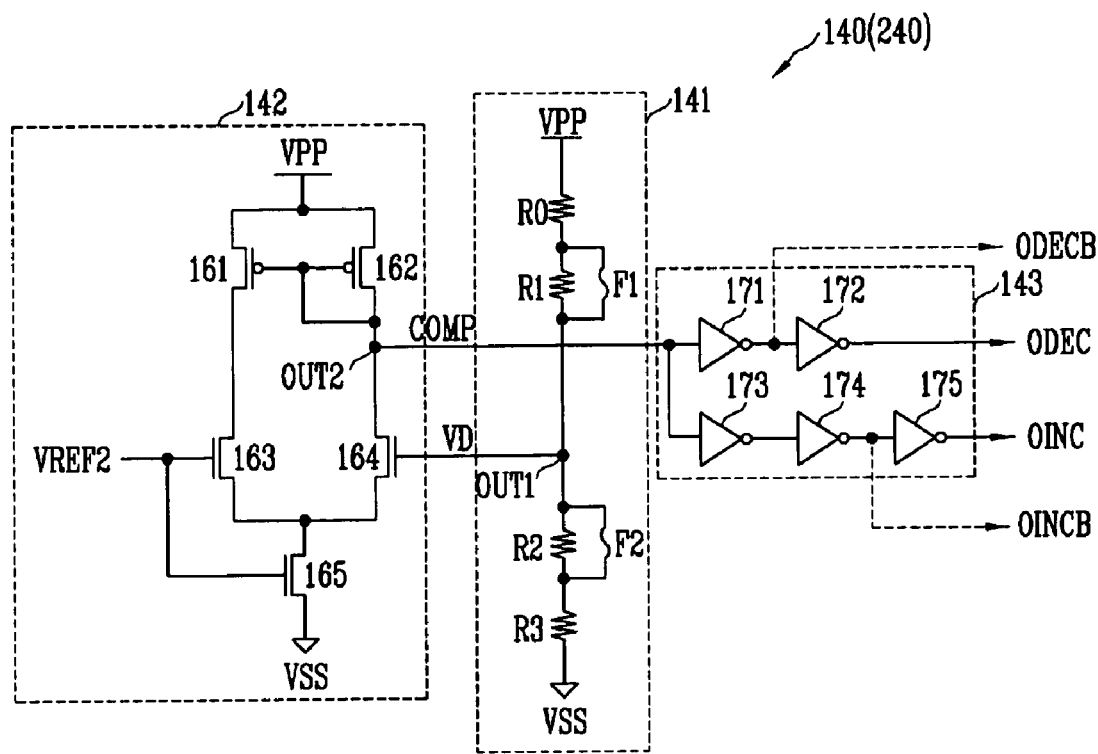
FIG. 3 is a detailed circuit diagram of the VPP voltage detector shown in FIG. 2.

FIG. 3 is a detailed circuit diagram of the VPP voltage detector shown in FIG. 2. Referring to FIG. 3, the VPP voltage detector 140 includes a voltage divider circuit 141, a differential amplifier 142 and an output logic circuit 143.

The voltage divider circuit 141 includes resistors R0 to R3 and fuses F1, F2. The voltage divider circuit 141 divides the VPP voltage (VPP) according to the resistance ratio set by the resistors R0 to R3 and outputs a divided voltage (VD) to an output node OUT1. This will be described in more detail.

The resistors R0, R1 are connected in series between the VPP voltage (VPP) and the output node OUT1. The resistors R2, R3 are connected in series between the output node OUT1 and the ground voltage (VSS). The fuse F1 is connected between an input terminal and an output terminal of the resistor R1. The fuse F2 is connected between an input terminal and an output terminal of the resistor R2. The resistance ratio of the voltage divider circuit 141 is decided according to the cutting or non-cutting state of the fuses F1, F2.

For example, when the fuse F1 is cut and the fuse F2 is not cut, the level of the divided voltage (VD) generated from the output node OUT1 is decided according to the resistance ratio of the resistors R0, R1 and R3. Consequently, as the resistance ratio of the voltage divider circuit 141 is changed, a detection target voltage of the VPP voltage (VPP) can be changed.

The differential amplifier 142 includes PMOS transistors 161, 162 and NMOS transistors 163, 164 and 165. The differential amplifier 142 compares the divided voltage (VD) and the reference voltage (VREF2) and outputs a compare signal (COMP) depending on the comparison result. The differential amplifier 142 outputs the compare signal (COMP) as a high level when the divided voltage (VD) is lower than the reference voltage (VREF2). Furthermore, the differential amplifier 142 outputs the compare signal (COMP) as a low level when the divided voltage (VD) is higher than the reference voltage (VREF2). The construction and operation of the differential amplifier 142 can be easily understood by those skilled in the art. Therefore, detailed description thereof will be omitted for simplicity.

The output logic circuit 143 outputs the first and second detection signals (ODEC, OINC) in response to the compare signal (COMP). The output logic circuit 143 can enable the first detection signal (ODEC) and disables the second detection signal (OINC) when the compare signal (COMP) is a high level. To the contrary, when the compare signal (COMP) is a low level, the output logic circuit 143 disables the first detection signal (ODEC) and enables the second detection signal (OINC).

Figure 4:
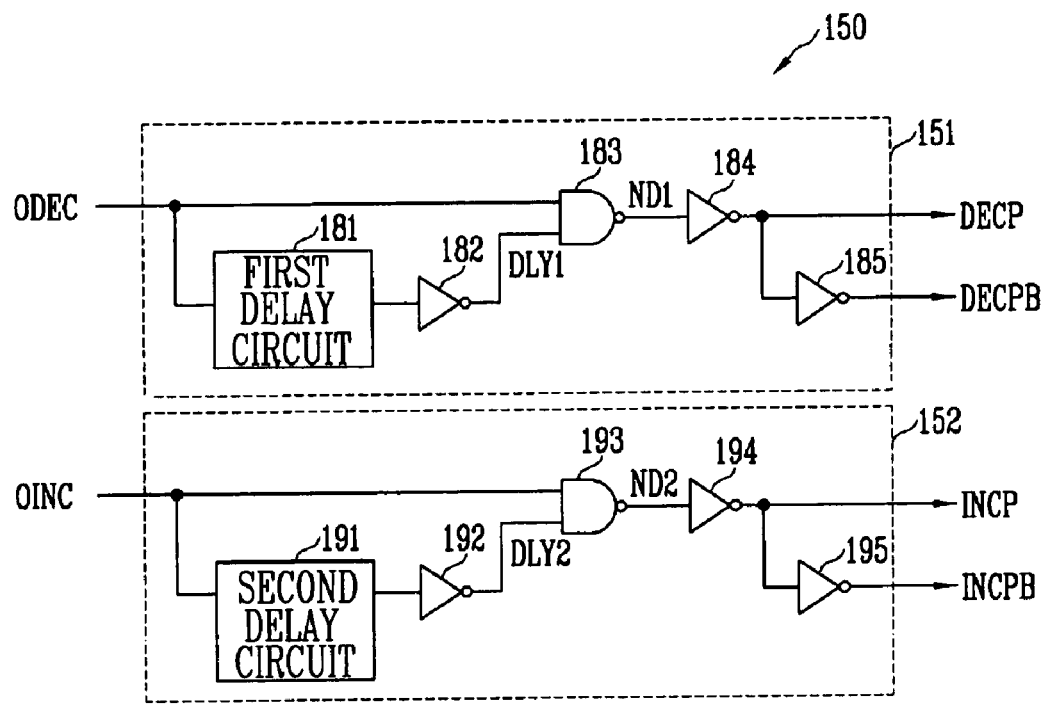
FIG. 4 is a detailed circuit diagram of a cycle control circuit shown in FIG. 2.

FIG. 4 is a detailed circuit diagram of the cycle control circuit shown in FIG. 2. Referring to FIG. 4, the cycle control circuit 150 includes a first control logic circuit 151 and a second control logic circuit 152.

The first control logic circuit 151 includes a first delay circuit 181, inverters 182, 184 and 185, and a NAND gate 183. The first delay circuit 181 delays the first detection signal (ODEC) and outputs a delayed signal. The inverter 182 inverts the output signal of the first delay circuit 181 and outputs an inverted signal (DLY1). The NAND gate 183 outputs a logic signal (ND1) in response to the first detection signal (ODEC) and the inverted signal (DLY1). The inverter 184 inverts the logic signal (ND1) and outputs an inverted signal as the first cycle control signal (DECP). The inverter 185 inverts the first cycle control signal (DECP) and outputs the inverted first cycle control signal (DECPB).

Figure 5A:
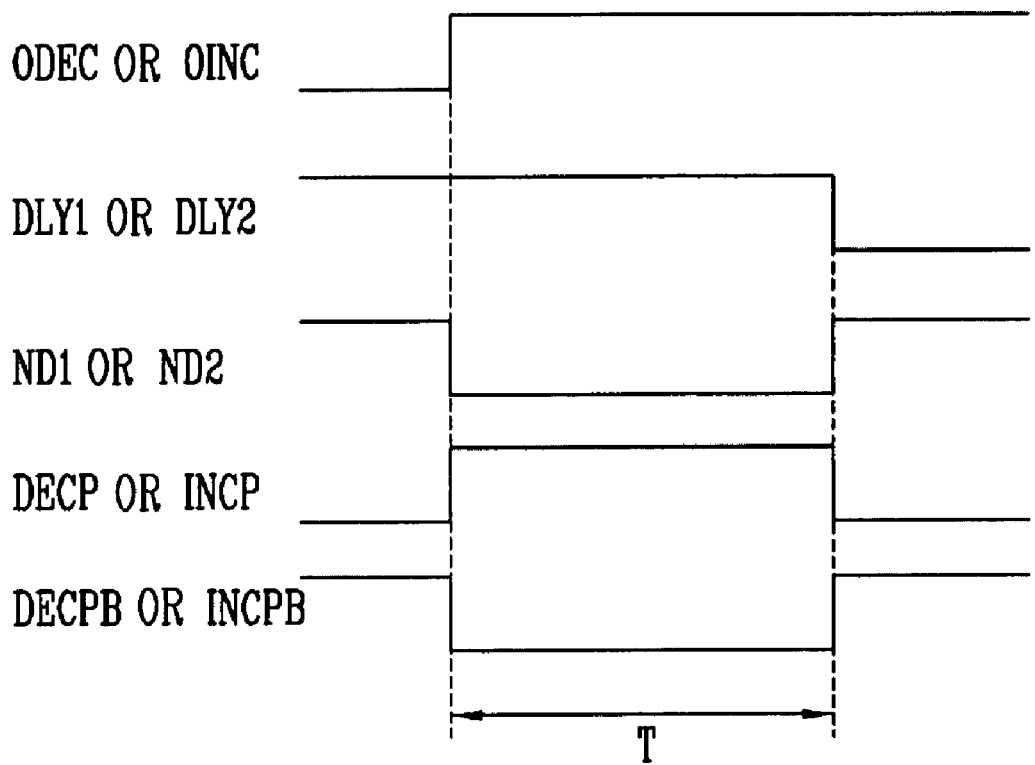
FIGS. 5a and 5b are timing diagrams of signals related to the operation of the cycle control circuit shown in FIG. 4.
Figure 5B:
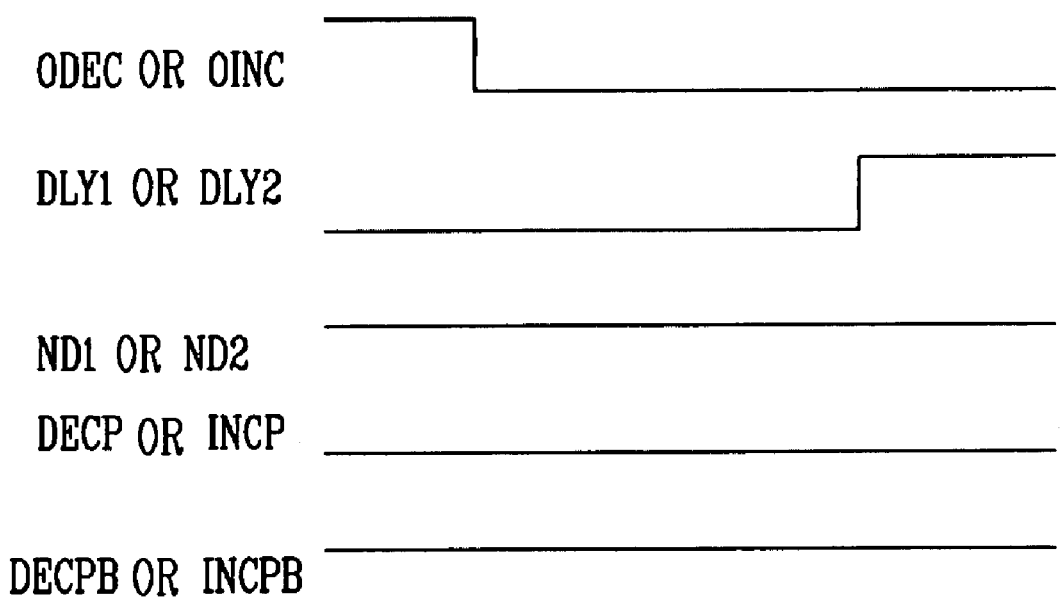

For example, when the first detection signal (ODEC) shifts from low to high (i.e., enabled), the first cycle control signal (DECP) is enabled during a predetermined time (T) as shown in FIG. 5a. Furthermore, when the first detection signal (ODEC) shifts from high to low (i.e., disabled), the first cycle control signal (DECP) is kept to low level as shown in FIG. 5b.

The second control logic circuit 152 includes a second delay circuit 191, inverters 192, 194 and 195 and a NAND gate 193. The construction and operation of the second control logic circuit 152 are the same as those of the first control logic circuit 151 except for I/O signals. Therefore, description thereof will be omitted in order to avoid redundancy.

Figure 6:
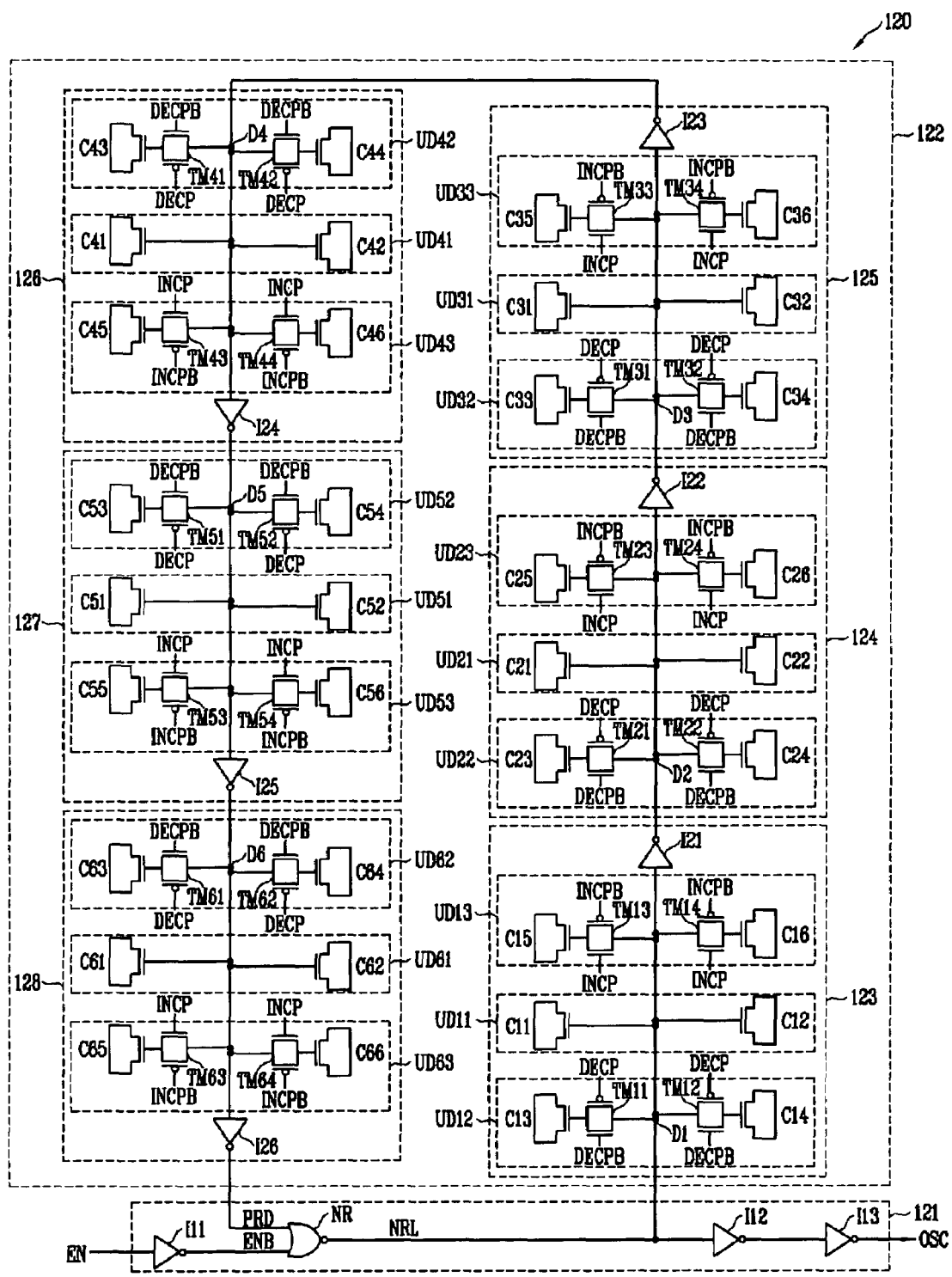
FIG. 6 is a detailed circuit diagram of an oscillator circuit shown in FIG. 2.

FIG. 6 is a detailed circuit diagram of an oscillator circuit shown in FIG. 2. Referring to FIG. 6, the oscillator circuit 120 includes a pulse generator 121 and a delay circuit 122.

The pulse generator 121 includes inverters I11 to I13 and a NOR gate NR. The inverter I11 inverts an enable signal (EN) and outputs an inverted enable signal (ENB). The NOR gate NR outputs an internal logic signal (NRL) in response to the inverted enable signal (ENB) and a delay signal (PRD). The inverter I12 inverts the internal logic signal (NRL). The inverter I13 inverts the output signal of the inverter I12 and outputs the inverted signal as the pumping control signal (OSC).

The delay circuit 122 includes delay control circuits 123 to 128 that are connected in series between the output terminal of the NOR gate NR and one of the input terminals of the NOR gate NR. The internal logic signal (NRL) input to the delay control circuit 123 can be delayed by the delay control circuits 123 to 128 and the delay control circuit 128 outputs the delayed signal (PRD) to the NOR gate NR. The construction and operation of the delay control circuits 123 to 128 are substantially the same as. Therefore, only the delay control circuit 123 will be described as an example.

The delay control circuit 123 includes an inverter I21 and first to third unit delay circuits UD11 to UD13. The inverter I21 inverts an input signal (i.e., the internal logic signal (NRL)) received through an input node D1 and outputs an inverted signal. The first unit delay circuit UD11 includes capacitors C1, C12 connected to the input node D1 parallel to the inverter I21. The first unit delay circuit UD11 delays an input signal during a first unit time.

The second unit delay circuit UD12 includes switching circuits TM11, TM12 connected between capacitors C13, C14, and the input node D1 and capacitors C13, C14, respectively. The switching circuits TM11, TM12 can be implemented using a pass gate. The switching circuits TM11, TM12 are turned on or off in response to the first cycle control signal (DECP) and the inverted first cycle control signal (DECPB). In more detail, when the first cycle control signal (DECP) is disabled, the switching circuits TM11, TM12 are turned on to connect the capacitors C13, C14 to the input node D1. As a result, the input signal is further delayed during a second unit time.

The third unit delay circuit UD13 includes capacitors C15, C16, and switching circuits TM13, TM14 connected between the input node D1 and the capacitors C15, C16, respectively. The switching circuits TM13, TM14 can be implemented using a pass gate. The switching circuits TM13, TM14 are turned on or off in response to the second cycle control signal (INCP) and the inverted second cycle control signal (INCPB). In more detail, when the second cycle control signal (INCP) is enabled, the switching circuits TM13, TM14 are turned on to connect the capacitors C15, C16 to the input node D1. As a result, the input signal is further delayed during a third unit time.

Meanwhile, when the first cycle control signal (DECP) is enabled and the second cycle control signal (INCP) is disabled, the switching circuits TM11 to TM14 are all turned off. Therefore, the input signal is delayed by the first unit delay circuit UD11 only during the first unit delay time, and is then input to the inverter I21.

The operation of the VPP voltage generator 100 will be described in more detail below.

Figure 7:
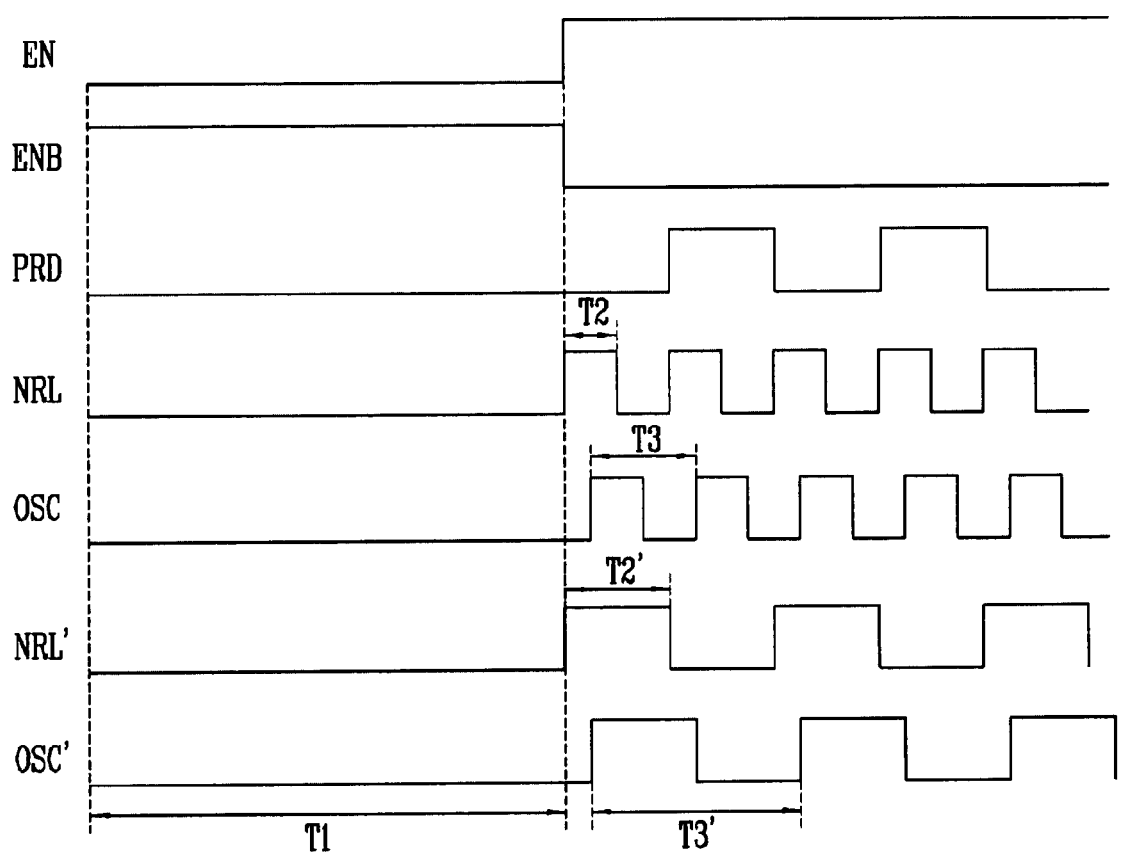
FIG. 7 is a timing diagram of signals related to the operation of the oscillator circuit shown in FIG. 5.

If a word line activation signal (WLACT) is enabled, the enable control circuit 110 compares the VPP voltage (VPP) with the reference voltage (VREF1) to determine whether the VPP voltage (VPP) is lower than the reference voltage (VREF1). If the VPP voltage (VPP) is higher than the reference voltage (VREF1), the enable control circuit 110 keeps the enable control signal (EN) disabled. As a result, as shown in FIG. 7, the oscillator circuit 120 does not generate the pumping control signal (OSC) of a pulse form during a period (T1) where the enable control signal (EN) is disabled.

Furthermore, when the VPP voltage (VPP) is lower than the reference voltage (VREF1), the enable control circuit 110 enables the enable control signal (EN). The oscillator circuit 120 generates the pumping control signal (OSC) of a pulse form in response to the enable control signal (EN).

At this time, an oscillation cycle of the oscillator circuit 120, i.e., a cycle (refer to T3 in FIG. 7) of the pumping control signal (OSC) is decided according to the first and second cycle control signals (DECP, INCP) and the inverted first and second cycle control signal (DECPB, INCPB).

The VPP voltage detector 140 detects the level of the VPP voltage (VPP) based on the reference voltage (VREF2) and outputs the first and second detection signals (ODEC, OINC). For example, when the VPP voltage (VPP) is lower than a predetermined set target voltage, the VPP voltage detector 140 enables the first detection signal (ODEC) and disables the second detection signal (OINC). As a result, the cycle control circuit 150 enables the first cycle control signal (DECP) and disables the second cycle control signal (INCP) during the set time (T).

As the switching circuits TM11 to TM14 to TM61 to TM64 of each of the delay control circuits 123 to 128 are turned off, the delay time of the delay circuit 122 decreases. As a result, as the enable period (T2) of the internal logic signal (NRL) reduces as shown in FIG. 7, the cycle (T3) of the pumping control signal (OSC) is reduced. If the cycle (T3) of the pumping control signal (OSC) reduces as described above, the pumping circuit 130 consecutively executes the charge pumping operation during the set time (T) and increases the VPP voltage (VPP).

Meanwhile, when the VPP voltage (VPP) is higher than the set target voltage, the VPP voltage detector 140 disables the first detection signal (ODEC) and enables the second detection signal (OINC). As a result, the cycle control circuit 150 disables the first cycle control signal (DECP) and enables the second cycle control signal (INCP) during the set time (T).

As the switching circuits TM11 to TM14 to TM61 to TM64 of each of the delay control circuits 123 to 128 are all turned on, the delay time of the delay circuit 122 is increased. As a result, as an enable period (T2') of an internal logic signal (NRL') is increased as shown in FIG. 7, a cycle (T3') of a pumping control signal (OSC') also increases. If the cycle (T3') of the pumping control signal (OSC') increases as described above, the charge pumping operation speed of the pumping circuit 130 decreases and the VPP voltage (VPP) is lowered accordingly.

As described above, the VPP voltage generator 100 can generate a stable VPP voltage (VPP) by selectively controlling the oscillation cycle (i.e., the cycle of the pumping control signal (OSC)) of the oscillator circuit 120 according to the level of the VPP voltage (VPP).

Figure 8:
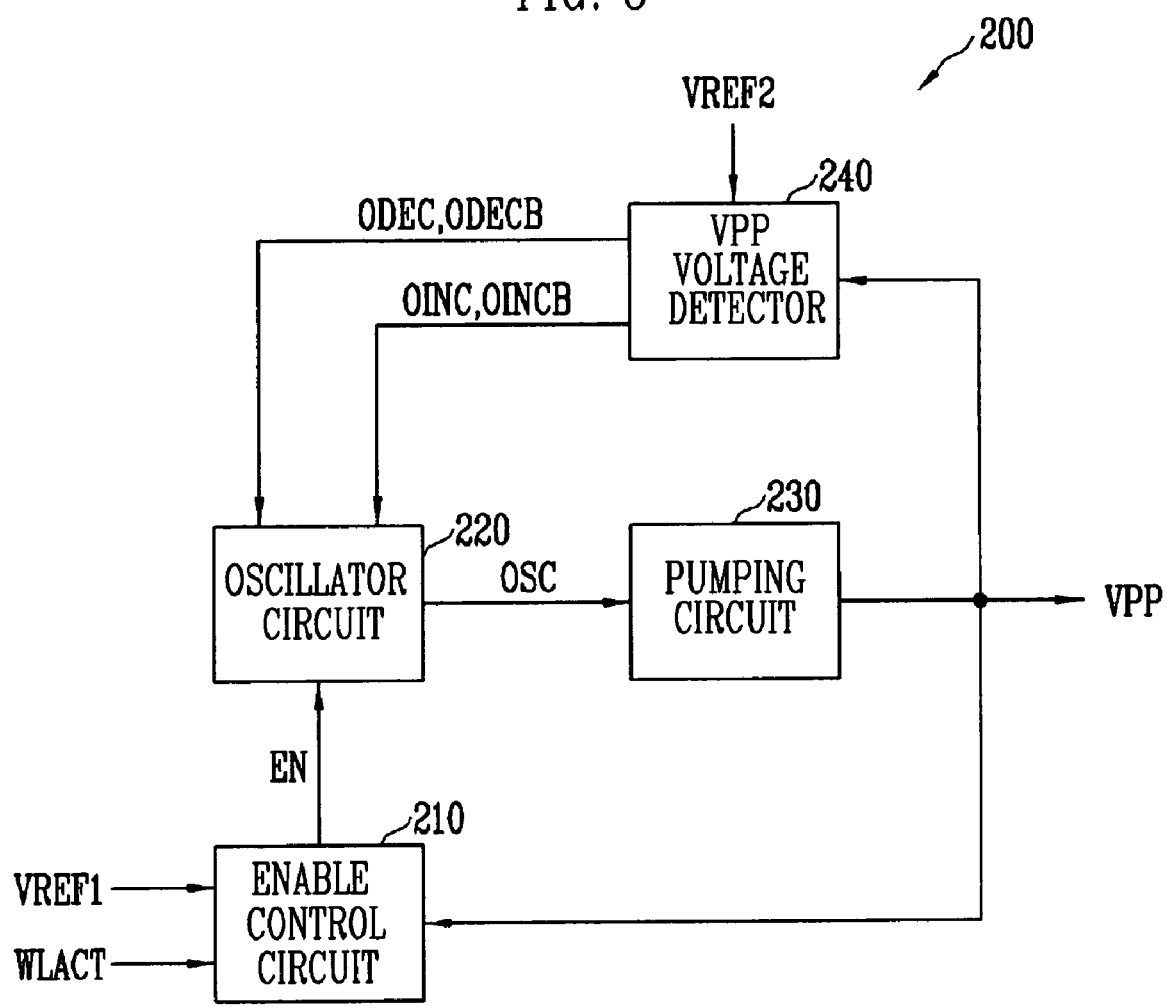
FIG. 8 is a schematic block diagram of a VPP voltage generator according to another embodiment of the present invention.

FIG. 8 is a schematic block diagram of a VPP voltage generator according to another embodiment of the present invention. Referring to FIG. 8, a VPP voltage generator 200 includes an enable control circuit 210, an oscillator circuit 220, a pumping circuit 230 and a VPP voltage detector 240.

The construction and operation of the VPP voltage generator 200 are substantially the same as those of the aforementioned VPP voltage generator 100, which has been described with reference to FIGS. 2 to 7, except for several points. Therefore, description thereof will be omitted in order to avoid redundancy.

The VPP voltage generator 200 is different from the VPP voltage generator 100 in that the cycle control circuit 150 is not included and the VPP voltage detector 240 further outputs inverted first and second detection signals (ODECB, OINCB). To realize it, the VPP voltage detector 240 further outputs the inverted first and second detection signals (ODECB, OINCB) as indicated by dotted arrows in FIG. 3.

The VPP voltage generator 200 is also different from the VPP voltage generator 100 in that the oscillation cycle of the oscillator circuit 220 is decided according to the first and second detection signals (ODEC, OINC) and the inverted first and second detection signals (ODECB, OINCB). To realize it, the first detection signal (ODEC) and the inverted first detection signal (ODECB) are input to the oscillator circuit 120 shown in FIG. 6 instead of the first cycle control signal (DECP) and the inverted first cycle control signal (DECPB), and the second detection signal (OINC) and the inverted second detection signal (OINCB) are also input to the oscillator circuit 120 instead of the second cycle control signal (INCP) and the inverted second cycle control signal (INCPB).

As described above, the VPP voltage generator according to the present invention generates a stable VPP voltage. Therefore, power consumption can be saved, a precharge time of word line can be prevented from increasing and a tRCD characteristic can be improved. It is thus possible to improve the operational performance of semiconductor memory devices.

Although the foregoing description has been made with reference to the preferred embodiments, it is to be understood that changes and modifications of the present invention may be made by the ordinary skilled in the art without departing from the spirit and scope of the present invention and appended claims.

What is claimed is:

1. A VPP voltage generator comprising:
   an oscillator circuit that periodically generates a pumping control signal of a pulse form based on an oscillation cycle according to first and second cycle control signals, the oscillator circuit being enabled in response to an enable control signal;
   a pumping circuit that performs a charge pumping operation in response to the pumping control signal, thus generating a VPP voltage;
   a VPP voltage detector that detects the level of the VPP voltage and outputs first and second detection signals according to the detection result;
   a cycle control circuit that outputs the first and second cycle control signals to the oscillator circuit and is configured to control the oscillation cycle in response to the first and second detection signals, wherein the cycle control circuit includes:
   a first control logic circuit that outputs the first cycle control signal and an inverted first cycle control signal in response to the first detection signal; and
   a second control logic circuit that outputs the second cycle control signal and an inverted second cycle control signal in response to the second detection signal; and
   an enable control circuit that compares the VPP voltage with a reference voltage and generates the enable control signal according to the comparison result, in response to a word line activation signal.

2. The VPP voltage generator of claim 1, wherein the enable control circuit enables the enable control signal if the VPP voltage is lower than the reference voltage when the word line activation signal is enabled, and the oscillator circuit is enabled when the enable control signal is enabled.

3. The VPP voltage generator of claim 1, wherein the VPP voltage detector includes:
   a voltage divider circuit that divides the VPP voltage according to a predetermined resistance ratio and outputs the divided voltage;
   a differential amplifier that compares the divided voltage with a reference voltage and outputs a compare signal according to the comparison result; and
   an output logic circuit that outputs the first and second detection signals in response to the compare signal.

4. The VPP voltage generator of claim 3, wherein the voltage divider circuit includes at least one fuse, and the resistance ratio of the voltage divider circuit is changed according to a cutting or non-cutting state of the fuse.

5. The VPP voltage generator of claim 3, wherein the differential amplifier outputs the compare signal as a high level when the divided voltage is lower than the reference voltage, and the output logic circuit enables the first detection signal and disables the second detection signal when the compare signal is a high level.

6. The VPP voltage generator of claim 1, wherein the first control logic circuit enables the first cycle control signal during a predetermined time when the first detection signal is enabled, and disables the first cycle control signal when the first detection signal is disabled, and the second control logic circuit enables the second cycle control signal during a predetermined time when the second detection signal is enabled, and disables the first cycle control signal when the second detection signal is disabled.

7. The VPP voltage generator of claim 1, wherein the oscillator circuit includes:
   a pulse generator that outputs an internal logic signal and the pumping control signal in response to the enable control signal and a delay circuit; and
   a delay circuit whose delay time is controlled according to the first and second cycle control signals and the inverted first and second cycle control signals, wherein the delay circuit delays the internal logic signal for the delay time and outputs a delay circuit.

8. The VPP voltage generator of claim 7, wherein the pulse generator includes:
   a first inverter that inverts the enable signal and outputs an inverted enable signal;
   a NOR gate that outputs the internal logic signal in response to the inverted enable signal and the delay signal; a second inverter that inverts the internal logic signal; and
   a third inverter that inverts the output signal of the second inverter and outputs the inverted signal as the pumping control signal.

9. The VPP voltage generator of claim 7, wherein when the first cycle control signal is disabled and the second cycle control signal is enabled, the delay time of the delay circuit is increased, and when the first cycle control signal is enabled and the second cycle control signal is disabled, the delay time of the delay circuit is reduced, when the delay time is increased, the cycle of the pumping control signal is increased, and when the delay time is reduced, the cycle of the pumping control signal is reduced and when the cycle of the pumping control signal is reduced, the pumping circuit raises the VPP voltage.

10. The VPP voltage generator of claim 8, wherein the delay circuit includes a plurality of delay control circuits that are connected in series between an output terminal of the NOR gate and one of input terminals of the NOR gate, and each of the plurality of delay control circuits includes:
   a fourth inverter that inverts an input signal received through an input node and outputs an inverted signal; a first unit delay circuit connected to the input node parallel to the fourth inverter, for delaying the input signal during a first unit time;
   a second unit delay circuit connected to the input node parallel to the fourth inverter, for delaying or not delaying the input signal for a second unit time in response to the first cycle control signal and the inverted first cycle control signal; and a third unit delay circuit connected to the input node parallel to the fourth inverter, for delaying or not delaying the input signal for a third unit time in response to the second cycle control signal and the inverted second cycle control signal.

11. The VPP voltage generator of claim 10, wherein the first unit delay circuit includes first capacitors connected to the input node in parallel, the second unit delay circuit includes:

second capacitors; and first switching circuits, which are connected between the input node and the second capacitors, respectively, and are turned on or off in response to the first cycle control signal and the inverted first cycle control signal, and the third unit delay circuit includes:

third capacitors; and second switching circuits, which are connected between the input node and the third capacitors, respectively, and are turned on or off in response to the second cycle control signal and the inverted second cycle control signal.

12. A VPP voltage generator comprising:

an oscillator circuit that periodically generates a pumping control signal of a pulse form based on an oscillation cycle set according to first and second detection signals, the oscillator circuit being enabled in response to an enable control signal;

a pumping circuit that performs a charge pumping operation in response to the pumping control signal, thus generating a VPP voltage;

a VPP voltage detector that detects the level of the VPP voltage and outputs to the oscillator circuit the first and second detection signals to control the oscillation cycle according to the detection result, wherein the VPP voltage detector includes:

a voltage divider circuit that divides the VPP voltage according to a predetermined resistance ratio and outputs the divided voltage;

a differential amplifier that compares the divided voltage with a reference voltage and outputs a compare signal according to the comparison result; and an output logic circuit that outputs the first and second detection signals and inverted first and second detection signals in response to the compare signal; and an enable control circuit that compares the VPP voltage with a reference voltage and generates the enable control signal according to the comparison result, in response to a word line activation signal.

13. The VPP voltage generator of claim 12, wherein the enable control circuit enables the enable control signal if the VPP voltage is lower than the reference voltage when the word line activation signal is enabled, and the oscillator circuit is enabled when the enable control signal is enabled.

14. The VPP voltage generator of claim 12, wherein the voltage divider circuit includes at least one fuse, and the resistance ratio of the voltage divider circuit is changed according to a cutting or non-cutting state of the fuse.

15. The VPP voltage generator of claim 12, wherein the differential amplifier outputs the compare signal as a high level when the divided voltage is lower than the reference voltage, and the output logic circuit enables the first detection signal and disables the second detection signal when the compare signal is a high level.

16. The VPP voltage generator of claim 12, wherein the oscillator circuit includes:

a pulse generator that outputs an internal logic signal and the pumping control signal in response to the enable control signal and a delay circuit; and a delay circuit whose delay time is controlled according to the first and second detection signals and the inverted first and second detection signals, wherein the delay circuit delays the internal logic signal for the delay time and outputs a delay circuit.

17. The VPP voltage generator of claim 16, wherein the pulse generator includes:

a first inverter that inverts the enable signal and outputs an inverted enable signal;

a NOR gate that outputs the internal logic signal in response to the inverted enable signal and the delay signal;

a second inverter that inverts the internal logic signal; and a third inverter that inverts the output signal of the second inverter and outputs the inverted signal as the pumping control signal.

18. The VPP voltage generator of claim 16, wherein when the first detection signal is disabled and the second detection signal is enabled, the delay time of the delay circuit is increased, and when the first detection signal is enabled and the second detection signal is disabled, the delay time of the delay circuit is reduced, when the delay time is increased, the cycle of the pumping control signal is increased, and when the delay time is reduced, the cycle of the pumping control signal is reduced and when the cycle of the pumping control signal is reduced, the pumping circuit raises the VPP voltage.

19. The VPP voltage generator of claim 17, wherein the delay circuit includes a plurality of delay control circuits that are connected in series between an output terminal of the NOR gate and one of input terminals of the NOR gate, and each of the plurality of delay control circuits includes:

a fourth inverter that inverts an input signal received through an input node and outputs an inverted signal;

a first unit delay circuit connected to the input node parallel to the fourth inverter, for delaying the input signal during a first unit time;

a second unit delay circuit connected to the input node parallel to the fourth inverter, for delaying or not delaying the input signal for a second unit time in response to the first cycle control signal and the inverted first cycle control signal; and a third unit delay circuit connected to the input node parallel to the fourth inverter, for delaying or not delaying the input signal for a third unit time in response to the second cycle control signal and the inverted second cycle control signal.

20. The VPP voltage generator of claim 19, wherein the first unit delay circuit includes first capacitors connected to the input node in parallel, the second unit delay circuit includes:

second capacitors; and first switching circuits, which are connected between the input node and the second capacitors, respectively, and are turned on or off in response to the first cycle control signal and the inverted first cycle control signal, and the third unit delay circuit includes:

third capacitors; and second switching circuits, which are connected between the input node and the third capacitors, respectively, and are turned on or off in response to the second cycle control signal and the inverted second cycle control signal.

* * * * *